Patented Apr. 2, 1946

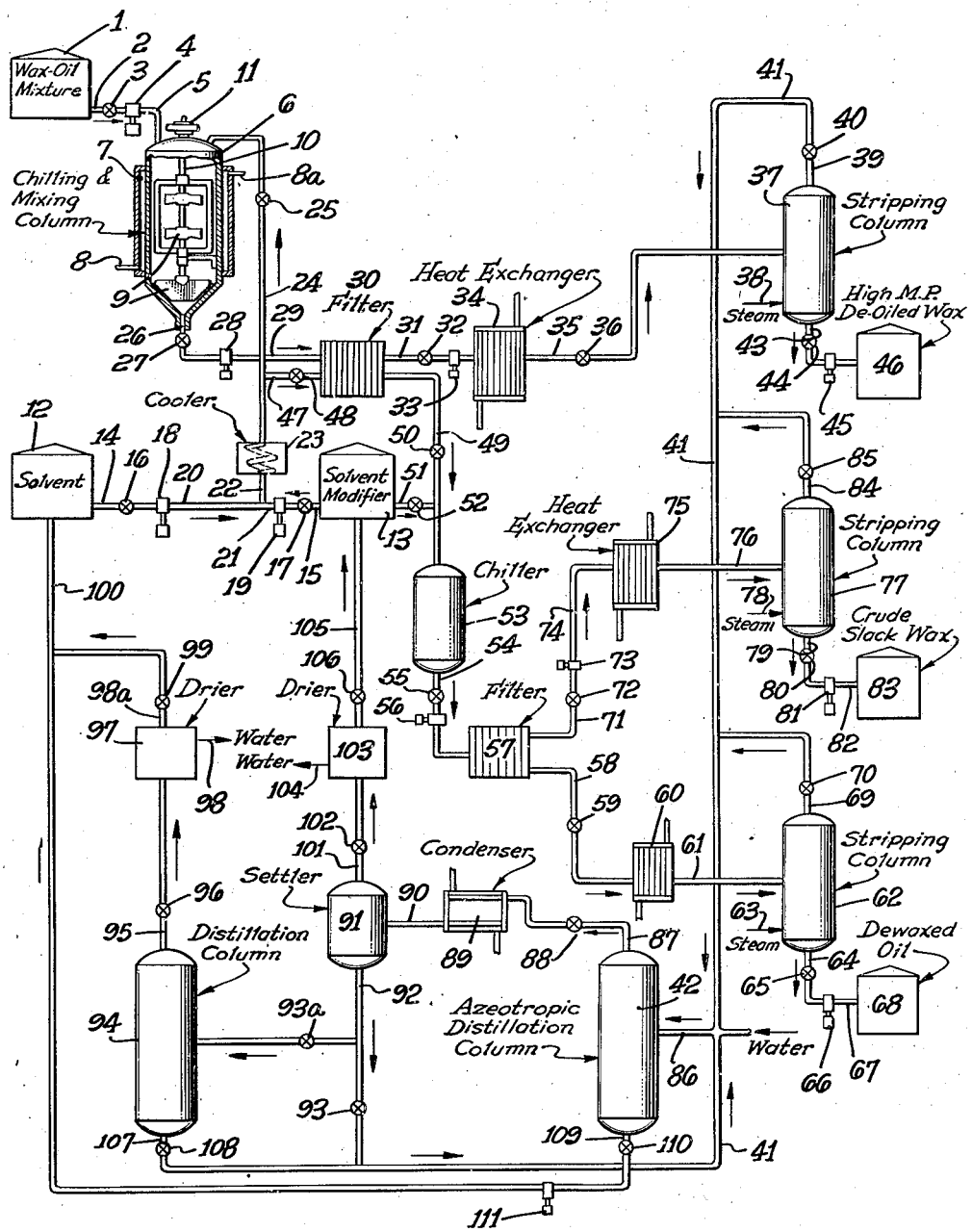

2,397,868

UNITED STATES PATENT OFFICE 2,397,868

TWO-STAGE DEOILING AND DEWAXING

Vance N. Jenkins, Palos Verdes Estates, Calif., assignor to Union Oil Company of California, Los Angeles, Calif., a corporation of California Application May 23, 1944, Serial No. 536,975

7 Claims. (Cl. 196—18)

The present invention relates to the separation of oil and wax from wax-oil mixtures such as waxy oils or oily waxes. The invention relates particularly to a process for separating wax and oil from wax-oil mixtures to produce low pour test lubricating oils and oil free high melting point waxes. The invention also relates to a process for treating slack wax to produce high melting point waxes, and is an improvement in the process described in my Patent No. 2,229,658, dated January 28, 1941.

The above patent describes a method of operation for the separation of wax and oil from wax-oil mixtures, such as a raffinate derived from the selective solvent extraction of distillate produced by the vacuum distillation of a waxy crude oil, or the raw distillate itself or other fractions obtained from waxy crude oils or the slack waxes obtained from such oils, or a crude oil residue containing wax.

In the performance of the above disclosed invention (Patent No. 2,229,658), I heat the selected wax stock sufficiently high to effect solution of wax contained in the oil. The molten wax-oil mixture is introduced into a chilling and mixing column provided with agitating or stirring paddles and scrapers. The molten wax-oil mixture is gradually cooled in said column to the desired temperature, i. e., to a point sufficiently low to crystallize the high melting point wax, while agitating the mixture to prevent the wax-oil mixture from setting up into a solid non-fluid mass.

When the desired temperature on the wax-oil mixture has been reached, a deoiling solvent such as one consisting of 90% methyl ethyl ketone (MEK) and 10% benzene is mixed with the wax-oil mixture in order to produce a slurry which filters readily. The solvent is preferably cooled to the temperature prevailing in the chilling and mixing column or to a lower temperature so as to prevent resolution of crystallized wax.

After the solvent has been mixed with the cooled wax-oil mixture containing the desired crystallized wax, the resulting slurry is withdrawn from said column and introduced into a filter where the wax suspended in the slurry by chilling is separated from the oil and the bulk of the solvent. The separated wax in this operation will contain a small amount of solvent as well as a small amount of oil. The oil-solvent filtrate from the filter is then passed through a heat exchanger where the temperature is raised so as to permit vaporization of the solvent. The preheated solution is then passed into an evaporator. The solvent is vaporized in the evaporator aided by a steam coil and the vapors are then passed through a mist extractor for the separation of entrained oil and into a condenser, wherein the solvent vapors are condensed before being returned to solvent storage.

The wax cake containing a minor portion of solvent and a small amount of oil, which was blended with additional solvent so as to place said wax cake in a fluid state in order to facilitate pumping, is then passed through a heat exchanger where it is heated to a sufficiently elevated temperature to effect vaporization of the solvent. The heated wax-solvent mixture is then passed into an evaporator. The solvent vapors are recovered from the evaporator, passed to a condenser and the condensed liquid returned to solvent storage. The high melting point solvent-free wax is withdrawn from said evaporator and pumped to storage.

The oil recovered from the oil-solvent filtrate may be passed to storage, or if the oil contains low melting point wax, which it does if the wax crystallization in the chilling and mixing column is carried out at a temperature sufficiently high to crystallize only the high melting point wax, it is subjected to a second dewaxing stage at a lower temperature. In the further dewaxing of the above mentioned oil, the said oil is mixed with a solvent such as one consisting of 50% methyl ethyl ketone (MEK) and 50% benzene. The solution of MEK-benzene and oil is then passed into a chiller where the solution is chilled to a sufficiently low temperature to precipitate substantially all of the low melting point wax contained in the solution.

When a temperature sufficiently low for dewaxing is attained in the chiller, the resulting slurry is withdrawn and pumped into a filter where the wax suspended in the slurry is separated from the oil and solvent. The filtrate consisting of oil and solvent is passed through a heat exchanger and then into an evaporator where the solvent is vaporized from the dewaxed oil and then condensed and pumped to storage. The dewaxed oil is withdrawn from the evaporator and pumped into dewaxed oil storage.

The solvent wet wax remaining in the above-mentioned filter is withdrawn and blended with a sufficient amount of solvent so as to put said wax in a pumpable state. The fluid wax is then passed through a heat exchanger and into an evaporator where the solvent is separated from the wax. The low melting point solvent-free wax is withdrawn from the evaporator and pumped to storage. The solvent vaporized in the evaporator is removed, condensed and returned to storage.

When carried out as above, it is apparent that four stripping operations are necessary to separate the solvent from the high melting wax, the low melting wax, the partly dewaxed oil, and the fully dewaxed oil, respectively. These operations involving the separation of the solvent from the oil involve distillation of a very large amount of solvent, and it would be very desirable from an economic standpoint to eliminate one of them. It is also apparent that steam cannot be used in these stripping operations, even though it is highly desirable, without introducing additional complicated solvent recovery apparatus, because MEK is so soluble in water.

It was also shown in the earlier patent that one of the above stripping operations could be omitted if the 50% benzene 50% MEK solvent for the second stage dewaxing could be prepared in the oil solution, merely by adding benzene (and MEK, if necessary) to the filtrate from the first dewaxing step, without distilling the filtrate to separate the 90% MEK 10% benzene solvent from the partly dewaxed oil in this filtrate. Operating in this manner, the solvent recovered by evaporation of solvent from the high melting point wax obtained from the first dewaxing stage will have a composition of 90% MEK and 10% benzene, i. e., the same composition as the solvent originally introduced into said first stage of dewaxing, the solvent recovered from evaporation of solvent from the low melting point wax obtained from the second dewaxing stage will have a composition of 50% MEK and 50% benzene, i. e., the same composition as the solvent originally introduced into said second stage of dewaxing; and the solvent recovered from the evaporation of solvent from dewaxed oil from the second dewaxing stage will also have a composition of 50% MEK and 50% benzene, i. e., the same composition as the solvent originally introduced into said second dewaxing stage.

The above process also discloses the use of 100% MEK and another solvent consisting of 20% MEK and 80% benzene as the original solvent stocks which may be blended to produce 90% MEK and 10% benzene for use in the first stage of dewaxing. The total recovered solvent therefore consists of a minor proportion of 90% MEK and 10% benzene and a major proportion of 50% MEK and 50% benzene. As a result of the above process a problem arises which consists of converting a portion of the recovered 50% MEK and 50% benzene back to the 90% MEK 10% benzene solvent required for the first stage treatment. Fractional distillation cannot be employed to separate MEK from benzene since they boil within approximately 0.5° C. of each other. A further problem arises when steam is employed, as is highly desirable, in the stripping of the solvent from the wax and from the oil, as mentioned above.

I have discovered a process wherein I can accomplish the simplified two-stage dewaxing operation just described and at the same time convert the recovered 50% MEK 50% benzene solvent into 90% MEK and 10% benzene and also use steam in all stripping operations. In order to accomplish this, I blend the 90% MEK and 10% benzene containing condensed steam recovered from the steam stripping of the high melting point wax, with the 50% MEK and 50% benzene containing condensed steam recovered from the steps wherein the low melting point wax and dewaxed oil, respectively, are stripped. This benzene-methyl ethyl ketone solution is converted into 90% methyl ethyl ketone and 10% benzene by subjecting it to distillation after adding enough water to said solution to form a ternary azeotrope, with all of the benzene present. This azeotrope consists of about 7.7% water, 19.0% methyl ethyl ketone, and 73.3% benzene, and when it is distilled overhead it leaves a bottoms consisting of 100% methyl ethyl ketone. The distillate is then cooled and allowed to separate into two phases, an aqueous phase and a solvent phase which is then dehydrated to yield a dry solvent consisting of about 20% MEK and 80% benzene. This is then mixed with the 100% methyl ethyl ketone in the proper proportions to form the 90% MEK 10% benzene solvent for use in the first stage of the two-stage process. The aqueous phase from the settling step is recycled to the azeotropic distillation step.

Thus, it is an object of my invention to separate wax-oil mixtures into their constituent components in a very simple and economical manner.

A further object of my invention resides in simplifying the procedure required for the recovery of used deoiling and dewaxing solvents.

Another object is the separation of MEK-benzene-water mixtures into components which may be reblended to obtain dry-MEK-benzene deoiling and dewaxing solvents having any desired composition between 20% MEK and 100% MEK.

Another object of my invention is the conversion of used deoiling and dewaxing solvents into the proper compositions for deoiling and dewaxing purposes.

Other objects and features of my invention will be apparent from the following description of the invention.

According to my invention for the treatment of wax-oil mixtures containing high percentages of high melting point waxes, such as solvent-extracted raffinate of high wax content, I operate the process in two stages, the first of which may be regarded as a deoiling stage and the second as a dewaxing stage. In the first stage the raffinate, for example, is heated to a temperature sufficient to dissolve completely the wax in the contained oil, after which the heated raffinate is cooled with constant agitation to atmospheric temperature or lower, so that the greater percentage of high melting point wax is crystallized in the form of large, well-defined, oil-free crystals. It is preferable to add a small amount of a deoiling solvent to the wax-oil mixture before it is cooled to final dewaxing temperatures when the slurry becomes so thick that it is difficult to stir and subsequent to the crystallization of substantially all of the desired high melting point wax. When the raffinate has been cooled to the desired deoiling temperature, a small amount of the deoiling solvent is mixed with the cooled raffinate to form a slurry which filters rapidly. As a solvent for admixture with the cooled raffinate, I use a mixture consisting of approximately 90% MEK and 10% benzene. The amount of solvent used will depend upon the desired viscosity of the resulting slurry.

The slurry produced in the above method is then filtered in the usual manner and the wax cake washed on the filter with a small amount of the solvent to remove entrained oil. The high melting point wax containing entrained solvent is introduced into a stripping column where by means of steam the solvent in said wax is vaporized and removed from the top of the column, this distillate consists of 90% MEK and 10% benzene and condensed steam. The high melting point wax is withdrawn from said stripping column and pumped to storage.

The filtrate from the above filter, which consists of oil, low melting point wax and solvent (90% MEK and 10% benzene) is blended with a sufficient amount of 20% MEK and 80% benzene to convert the composition of said solvent to approximately 50% MEK and 50% benzene. The filtrate consisting of oil, low melting point wax and 50% MEK and 50% benzene solvent is introduced into a second chilling and mixing column provided with agitating or stirring paddles and scrapers. The resulting slurry produced in the above cooling stage is withdrawn from said column and introduced into another filter where the low melting point wax suspended in the slurry is separated from the oil and solvent. The oil solvent filtrate is then passed through a heat exchanger where the temperature is raised so as to permit vaporization of the solvent. The preheated solution is then passed into a stripping column where the solvent is vaporized with the aid of stripping steam. The recovered vapors are then condensed. The condensed product consists of 50% MEK and 50% benzene and condensed steam.

The wax separated in the above described filter is passed through a heat exchanger where it is heated to a sufficiently elevated temperature to effect vaporization of the solvent. The heated wax-solvent mixture is then passed into a stripping column where the solvent is vaporized with the aid of stripping steam. The solvent vapors and steam are recovered from the stripping column and passed to a condenser. The condensed product consists of 50% MEK 50% benzene solvent and condensed steam. The low melting point solvent-free wax is withdrawn from said stripping column and pumped to a storage.

The 90% MEK and 10% benzene solvent and 50% MEK 50% benzene solvent, and condensed steam recovered from the above steps, respectively, are blended together. The resulting product will consist substantially of a 50% MEK and 50% benzene mixture with a minor portion of condensed steam. This mixture is then subjected to azeotropic distillation in the presence of water to produce an azeotropic distillate comprising about 19.0% MEK, 73.3% benzene, and 7.7% water and a residual fraction comprising 100% MEK. The 100% MEK recovered as bottoms from the azeotropic distillation is removed from the azeotropic column and passed to storage. The azeotropic distillate consisting of MEK, benzene, and water, is removed from the azeotropic column overhead and then condensed. The condensed distillate is cooled and then passed to a settler wherein a separation occurs to form a lower layer of water containing a minor portion, such as about 2% MEK, and an upper layer consisting of about 20% MEK and 80% benzene and a minor proportion of dissolved and suspended water. The upper layer is removed from the settler and passed through a salt drier where the water and salt solution is removed, leaving a non-aqueous mixture of 20% MEK and 80% benzene which is returned to storage. The lower layer consisting of water and a minor proportion of MEK is removed from the bottom of the settler and pumped either directly back to the azeotropic distillation column, or to a distillation tower wherein the MEK is distilled over. In the latter case the distillate will contain a minor proportion of water, therefore, it is first necessary to pass it through a drier to remove said water before passing the MEK to storage. The water left as bottoms in the distillation column is removed and returned to the azeotropic distillation column to act as an azetrope former.

The methyl ethyl ketone from 100% methyl ethyl ketone storage is then blended in the proper proportions with the MEK-benzene mixture from the 20% methyl ethyl ketone, 80% benzene storage to produce a mixture of 90% methyl ethyl ketone and 10% benzene which is then recycled to the first stage dewaxing to act as a dewaxing solvent.

The method of operation of my invention may be better understood by reference to the description of the drawing. Referring to a specific example carried out in a unit substantially as shown in the drawing wherein a waxy raffinate stock was used which was produced by solvent extracting a waxy distillate having such gravity and viscosity characteristics as to produce a finished S. A. E. 50 lubricating oil. The waxy distillate was extracted with about 3 volumes of phenol at a temperature of 180° F. The raffinate resulting from such extraction had an A. P. I. gravity of 31.5°, a viscosity of 65 seconds Saybolt Universal at 210° F., a pour point of 110° F., and a wax content of approximately 23%. A 1000 volume portion of the above described waxy raffinate was introduced into tank 1 and subsequently heated to a temperature of 150° F. so as to effect solution of wax contained in the oil. The waxy raffinate was then withdrawn from tank 1 through line 2, controlled by valve 3, and pumped by pump 4 through line 5 and into chilling and mixing column 6. Column 6 was provided with jacket 7 which encircled said column, into which a cooling liquid to cool the wax-oil mixture was introduced via line 8 and withdrawn via line 8a. Column 6 was provided with agitating paddles and scrapers 9 on shaft 10 which was rotated by pulley 11 connected to a source of power not shown. The molten wax-oil mixture was gradually cooled in column 6 to about 60° F. at a rate of about 60° F. per hour. During the cooling to 60° F. the contents of column 6 were constantly stirred by the agitating paddles and scrapers by the rotation of same at a moderate rate sufficient to prevent the wax mass from setting up into a solid mass. The thus cooled waxy raffinate containing part of the wax content in crystalline form was then mixed with 1700 volumes of approximately 90% methyl ethyl ketone and 10% benzene solvent. The solvent was mixed with the cooled wax-oil mixture in column 6 and was withdrawn from storage tank 12 which contained 100% MEK, and tank 13 which contained 20% MEK and 80% benzene solvent and introduced into column 6 via lines 14 and 15, respectively, controlled by valves 16 and 17 and pumped by pumps 18 and 19 via lines 20 and 21, respectively, into line 22 and through cooler 23 and line 24 controlled by valve 25. The MEK-benzene solvent pumped from tanks 12 and 13 were blended in the necessary proportions so that the solvent entering column 6 consisted of approximately 90% MEK and 10% benzene. The solvent was cooled before introduction into column 6 to the temperatures prevailing in said column by means of cooler 23.

After the solvent had been mixed with the cooled wax-oil mixture containing the desired crystallized wax, the resulting slurry was withdrawn from the bottom of the column via line 26 controlled by valve 27 and pumped by pump 28 through line 29 to filter. The slurry was then filtered under about three inches of vacuum with ten inches of vacuum on the washing section of the filter. The cake on the filter was then washed with about 500 volumes of the MEK-benzene solvent which was applied as a spray. The wax cake and occluded solvent separated in filter 30 were removed with the aid of 400 volumes of solvent introduced into said filter by means of lines 24 and 47 and controlled by valve 48, via line 31, controlled by valve 32 and pumped by pump 33 through heat exchanger 34 where it was heated to a sufficiently elevated temperature to effect vaporization of the solvent. The heated wax was then passed via line 35 controlled by valve 36 into stripping column 37 which was provided with stripping steam introduced therein through line 38. The solvent vapors and steam were recovered from the stripping column via line 39 controlled by valve 40 and passed into line 41 for passage to azeotropic distillation column 42. One hundred and sixty (160) volumes of high melting point wax remained after said stripping operation, which was withdrawn from stripping column 37 via line 43, controlled by valve 44 and pumped by pump 45 into storage tank 46. The wax cake recovered tested 158° F. melting point (Galician), .912 specific gravity at 60° F. and appeared to be oil-free. After being treated with only 8% of filter clay, it was a marketable water-white wax. The total distillate recovered in the above stripping operations consisted of 819 volumes of 90% methyl ethyl ketone, 10% benzene solvent and 40 volumes of water.

The oil solvent filtrate consisting of about 615 volumes of oil stock, 1781 volumes of 90% methyl ethyl ketone, 10% benzene solvent and 225 volumes of low melting point wax was then passed into line 49 controlled by valve 50 and then mixed with approximately 2420 volumes of 20% MEK and 80% benzene solvent from tank 13 via line 51 and valve 52, thereby creating a mixture consisting of 615 volumes of oil stock, 4201 volumes of 50% MEK, 50% benzene solvent and 225 volumes of low melting point wax. The resulting mixture was then passed into chiller 53 where the solution was chilled to about 15° F. in order to precipitate the low melting point wax from the solution.

The resulting slurry was withdrawn via line 54 controlled by valve 55 and pumped by pump 56 into filter 57 and filtered under a vacuum of about 3 inches to separate the precipitated wax from the chilled slurry. The filtration rate was 14 gallons per square foot of filter area per hour. Four hundred (400) volumes of solvent was then added to the wax cake having occluded solvent, so as to facilitate the removal of the said cake from the filter. The filtrate consisting of 615 volumes of oil plus 4981 volumes of solvent was then passed via line 58 controlled by valve 59 through heat exchanger 60 and line 61 into stripping column 62 provided with a means for introducing stripping steam 63 where the solvent was vaporized from the dewaxed oil which yielded as an overhead fraction a solvent consisting of 1981 volumes of MEK and 3000 volumes of benzene and 220 volumes of water. The dewaxed oil was withdrawn from the stripping column 62 via line 64 controlled by valve 65 and pumped by pump 66 through line 67 into storage tank 68. The vaporized solvent and steam was removed from the stripping column by means of line 69 controlled by valve 70 and introduced into line 41.

The wax cake and solvent in filter 57 was withdrawn via line 71, controlled by valve 72 and pumped by pump 73 through line 74, heat exchanger 75 and line 76 into stripping column 77 provided with means for introducing stripping steam 78, where the solvent was vaporized from the wax to produce a distillate consisting of 778 volumes of benzene and 522 volumes of MEK and 61 volumes of water. The molten crude slack wax was withdrawn from the stripping column 77 via line 79 controlled by valve 80 and pumped by pump 81 through line 82 into storage tank 83. The vaporized solvent and steam was removed from the stripping column by means of line 84 controlled by valve 85 and pumped into line 41.

The condensed distillate recovered from stripping columns 37, 77 and 62 and introduced into line 41 and admixed therein consisted of 3270 volumes of MEK and 3860 volumes of benzene solvent and 321 volumes of water, which was introduced into azeotropic distillation column 42 by means of line 86.

The mixture in the azeotropic column was distilled with an overhead vapor temperature of about 156° F. at which point an azeotrope consisting of 993 volumes of MEK and 3860 volumes of benzene solvent and 19 volumes of water was distilled over, leaving as bottoms in the azeotrope column 2230 volumes of methyl ethyl ketone. The above described overhead formed in column 42 was withdrawn via line 87 controlled by valve 88 and condensed and cooled to 80° F. in condenser 89 and the condensate withdrawn therefrom by means of line 90 and introduced into settler 91, wherein a separation occurred to form an upper layer consisting of 17 volumes of water and 4853 volumes of 20% MEK 80% benzene solvent, and a lower aqueous layer consisting of 395 volumes of water and 17 volumes of methyl ethyl ketone. The lower layer was withdrawn from settler 91 via line 92 controlled by valve 93a and introduced into distillation column 94 and subjected to distillation at an overhead temperature of about 164° F. which produced as an overhead wet methyl ethyl ketone consisting of 1.7 volumes of water and 17 volumes of methyl ethyl ketone. The wet MEK distilled over was withdrawn via line 95 controlled by valve 96 and cooled in a cooler, not shown, and then introduced into salt drier 97 where the water and salt solution was removed by means of line 98. The dry MEK was withdrawn via line 98a, controlled by valve 99 and introduced into line 100 and then to 100% MEK storage 12. The upper layer in settler 91 was withdrawn therefrom via line 101 controlled by valve 102 and introduced into salt drier 103 wherein the water and salt solution was removed and disposed of through line 104 to yield 4852 volumes of 20% MEK and 80% benzene solvent. The dry solvent was withdrawn via line 105 controlled by valve 106 and introduced into 20% MEK 80% benzene solvent storage 13 for blending with dry MEK from tank 12 before recycling to the first deoiling stage. The water remaining in distillation column 94 was withdrawn via line 107 controlled by valve 108 and introduced into azeotropic column 42 via lines 41 and 86 to act as an azeotrope former.

The bottoms in the azeotropic distillation column 42 consisting of 100% MEK was withdrawn via line 109 controlled by valve 110 and pumped by pump 111 through line 100 and into 100% MEK storage 12, where it was withdrawn for recycling to the first deoiling stage. As an alternative, in case there is insufficient condensed steam in the feed to azeotropic column 42, the lower layer of water from settler 91 may be introduced into column 42, by means of line 92, controlled by valve 93, and lines 41 and 86 instead of routing same into column 94, as described above.

The foregoing two-stage dewaxing and solvent recovery process has been described with reference to the treatment of raffinates. It will be understood that I may treat any wax-oil mixture in two stages, as above, whether it be an oily wax, such as a slack wax which has been separated from oil by conventional dewaxing processes, or a waxy oil such as raw waxy distillate.

It will be observed that in the foregoing description of the invention I have shown that a mixture consisting of approximately 90% MEK and 10% benzene is used as a solvent in the first stage (deoiling stage) and a mixture consisting of approximately 50% MEK and 50% benzene in the second stage (dewaxing stage). However, it is to be understood that the invention is in no way limited to the use of these specific mixtures. In fact, the invention includes any solvent treatment in the two stages described above by means of a MEK-benzene solvent mixture wherein the MEK concentrate is greater than 20%. The solvent mixture of MEK and benzene is governed and controlled by the amount of 100% MEK solvent from solvent storage 12 and 20% MEK, 80% benzene solvent mixture from storage 13 introduced into the system. The solvent employed in the first dewaxing stage is preferably richer in methyl ethyl ketone than the solvent employed in the second stage. The preferable solvent for use in the first stage should have a MEK concentration ranging between about 80% to 100%. The MEK concentration in the second stage solvent is preferably between about 40% to 60%, although the invention is not limited to these concentrations.

The foregoing exemplary description of my invention is not to be considered as limiting since many variations may be made by those skilled in the art within the scope of the following claims without departing from the spirit thereof. It will be observed that in the foregoing description of the drawing, I have shown only single pieces of apparatus for carrying out the process. It is to be understood that duplicate equipment may be provided where necessary, which may be operated alternately so that the process may be carried out more or less continuously.

I claim:

1. In a process for the separation of a mixture comprising lubricating oil, low melting wax and high melting wax, wherein the separation is effected in two stages in which the high melting wax is separated in the first stage by a dewaxing solvent containing approximately 90% methyl ethyl ketone and 10% benzene, and the low melting wax is separated in the second stage by a dewaxing solvent containing approximately 50% methyl ethyl ketone and 50% benzene, the step which comprises fractionally distilling the solvent which is poor in methy ethyl ketone, in the presence of a sufficient amount of water, whereby two fractions are obtained one of which consists of methyl ethyl ketone free from benzene and the other of which consists of water and benzene containing about 20% of methyl ethyl ketone.

2. In a process for the separation of a mixture comprising lubricating oil, low melting wax and high melting wax wherein the separation is effected in two stages in which the high melting wax is separated at higher temperatures in the first stage by a dewaxing solvent containing approximately 90% methyl ethyl ketone and 10% benzene, and the low melting wax is separated at lower temperatures in the second stage by a dewaxing solvent containing approximately 50% methyl ethyl ketone and 50% benzene, the step which comprises steam stripping the high melting wax containing occluded solvent, low melting wax containing occluded solvent and lubricating oil containing solvent, separating the solvent and steam from the wax and oil and azeotropically distilling the solvent which is poor in methyl ethyl ketone, in the presence of a sufficient additional amount of water, whereby two fractions are obtained one of which consists of methyl ethyl ketone free from benzene and the other of which consists of water and benzene containing about 20% of methyl ethyl ketone, removing the water from the second fraction, leaving a solvent consisting of approximately 80% benzene and 20% methyl ethyl ketone.

3. A process for the separation of wax-oil mixtures which are solid at the herein described temperature of wax separation which comprises bringing said oil to a state wherein the wax present is substantially completely dissolved in the oil present in said mixture, slowly cooling said wax-oil solution to crystallize the high melting wax with slow agitation in the presence of a quantity of methyl ethyl ketone-benzene solvent sufficient to reduce the viscosity of the wax-oil but insufficient in amount to maintain the waxy oil fluid at the dewaxing temperature in the absence of said agitation, commingling said cooled mixture containing high melting crystallized wax with a cooled dewaxing solvent containing methyl ethyl ketone and benzene wherein said solvent is rich in methyl ethyl ketone, separating the solvent solution of oil and non-crystallized low melting wax from the crystallized wax, slowly cooling said solvent solution of oil and non-crystallized low melting wax with a dewaxing solvent containing methyl ethyl ketone and benzene wherein said solvent is poor in methyl ethyl ketone, separating the solvent solution of oil from the low melting crystallized wax, separating the solvent from the oil and azeotropically distilling the solvent in the presence of water.

4. A process for the separation of wax-oil mixtures which are solid at the herein described temperature of wax separation which comprises bringing said oil to a state wherein the wax present is substantially completely dissolved in the oil present in said mixture, slowly cooling said wax-oil solution to crystallize the high melting wax with slow agitation in the presence of a quantity of methyl ethyl ketone-benzene solvent sufficient to reduce the viscosity of the wax-oil but insufficient in amount to maintain the waxy oil fluid at the dewaxing temperature in the absence of said agitation, commingling said cooled mixture containing high melting crystallized wax with a cooled dewaxing solvent containing approximately 90% methyl ethyl ketone and approximately 10% benzene, separating the solvent solution of oil and non-crystallized low melting wax from the crystallized wax, slowly cooling said solvent solution of oil and non-crystallized low melting wax with a dewaxing solvent containing approximately 50% methyl ethyl ketone and approximately 50% benzene, steam stripping the high melting wax containing occluded solvent, low melting wax containing occluded solvent and lubricating oil containing solvent, separating the solvent and steam from the wax and oil and azeotropically distilling the solvent which is poor in methyl ethyl ketone, in the presence of a sufficient additional amount of water, whereby two fractions are obtained, one of which consists of methyl ethyl ketone free from benzene and the other of which consists of water and benzene containing about 20% of methyl ethyl ketone, removing the water from the second fraction, leaving a solvent consisting of approximately 80% benzene and 20% methyl ethyl ketone.

5. A process according to claim 4 wherein said last named solvent consisting of approximately 80% benzene and 20% methyl ethyl ketone is added to the solvent solution of oil and non-crystallized low melting wax in which the solvent contains approximately 90% methyl ethyl ketone and approximately 10% benzene in a quantity sufficient to produce a solvent therein containing approximately 50% methyl ethyl ketone and approximately 50% benzene.

6. A process according to claim 4 wherein the last named solvent consisting of approximately 80% benzene and 20% methyl ethyl ketone is blended with methyl ethyl ketone free from benzene which is produced as one fraction in the azeotropic distillation to produce a solvent containing approximately 90% methyl ethyl ketone and approximately 10% benzene which solvent is cooled and added to the cooled wax-oil mixture containing high melting crystallized wax.

7. A process according to claim 4 wherein a portion of the last named solvent consisting of approximately 80% benzene and 20% methyl ethyl ketone is mixed with the fraction obtained in the azeotropic distillation consisting of methyl ethyl ketone free from benzene to produce a dewaxing solvent containing approximately 90% methyl ethyl ketone and approximately 10% benzene which solvent is cooled and mixed with the cooled wax-oil mixture containing high melting crystallized wax and wherein a second portion of the last named solvent consisting of approximately 80% benzene and 20% methyl ethyl ketone is added to the cooled solution of oil and non-crystallized low melting wax with solvent containing approximately 90% methyl ethyl ketone and approximately 10% benzene to produce a solvent therein containing approximately 50% methyl ethyl ketone and approximately 50% benzene.

VANCE N. JENKINS.